United States Patent [19]

Grantz et al.

[11] Patent Number: 5,513,571
[45] Date of Patent: May 7, 1996

[54] AIRBREATHING PROPULSION ASSISTED GUN-LAUNCHED PROJECTILES

[75] Inventors: Arthur C. Grantz, Redondo Beach; Kevin G. Bowcutt; Richard T. Cervisi, Irvine, all of Calif.

[73] Assignee: Rockwell International Corporation, Seal Beach, Calif.

[21] Appl. No.: 245,130

[22] Filed: May 17, 1994

[51] Int. Cl.$^6$ .................................................. F42B 10/34
[52] U.S. Cl. .................................................. 102/374; 102/520
[58] Field of Search ................................. 102/520, 574; 60/257, 270.1, 244, 225

[56] References Cited

U.S. PATENT DOCUMENTS

| | | | |
|---|---|---|---|
| 2,989,922 | 6/1961 | Greenwood et al. | 102/49 |
| 4,291,533 | 9/1981 | Dugger et al. | 60/240 |
| 4,428,293 | 1/1984 | Botwin et al. | 102/381 |
| 4,539,911 | 9/1985 | Flatau | 102/374 |
| 4,936,219 | 1/1990 | Mudd | 102/520 |
| 5,067,406 | 11/1991 | Olson et al. | 102/374 |
| 5,224,344 | 7/1993 | Keirsey et al. | 60/244 |

*Primary Examiner*—Charles T. Jordan
*Assistant Examiner*—Christopher K. Montgomery
*Attorney, Agent, or Firm*—Charles T. Silberberg; Lawrence N. Ginsberg; Terrell P. Lewis

[57] ABSTRACT

An air-breathing, propulsion-assisted projectile designed to be rocket or gun launched and capable of accelerating to hypersonic velocities includes a body having an encompassing cowl, an air compression section, an engine assembly located adjacent the air compression section, and a nozzle section located adjacent the engine assembly. The engine assembly includes apparatus for fuel storage and delivery to a combustion region. The rear end portion of the cowl is configured to direct the exiting combusted air-and-fuel mixture over the nozzle section of the body.

30 Claims, 4 Drawing Sheets

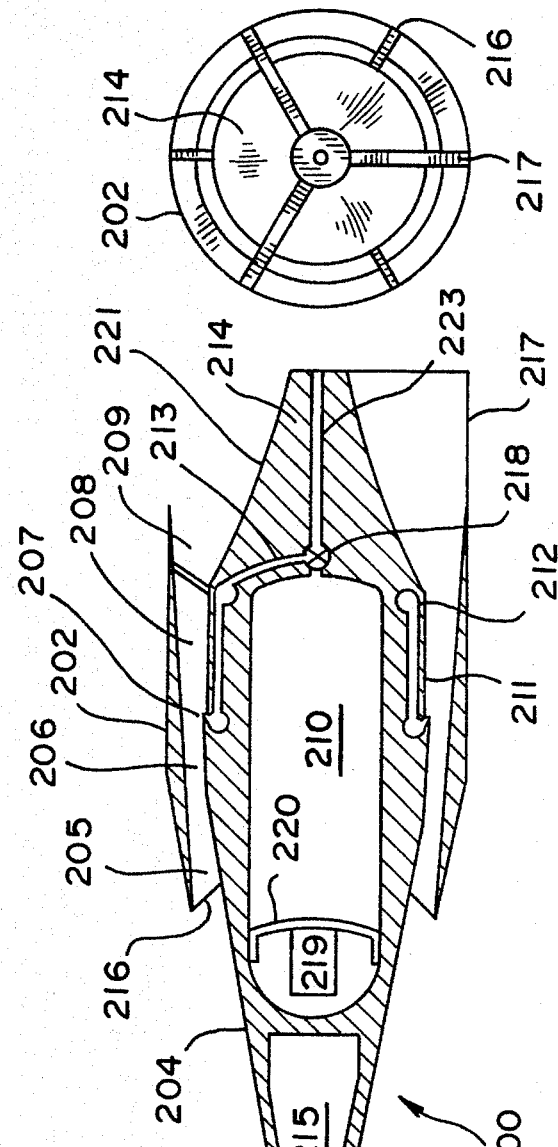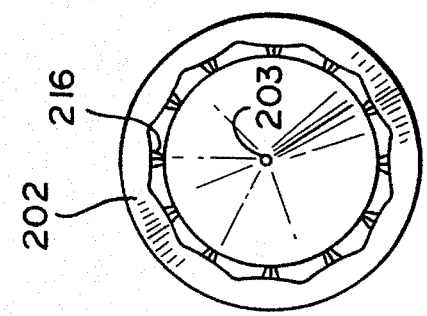

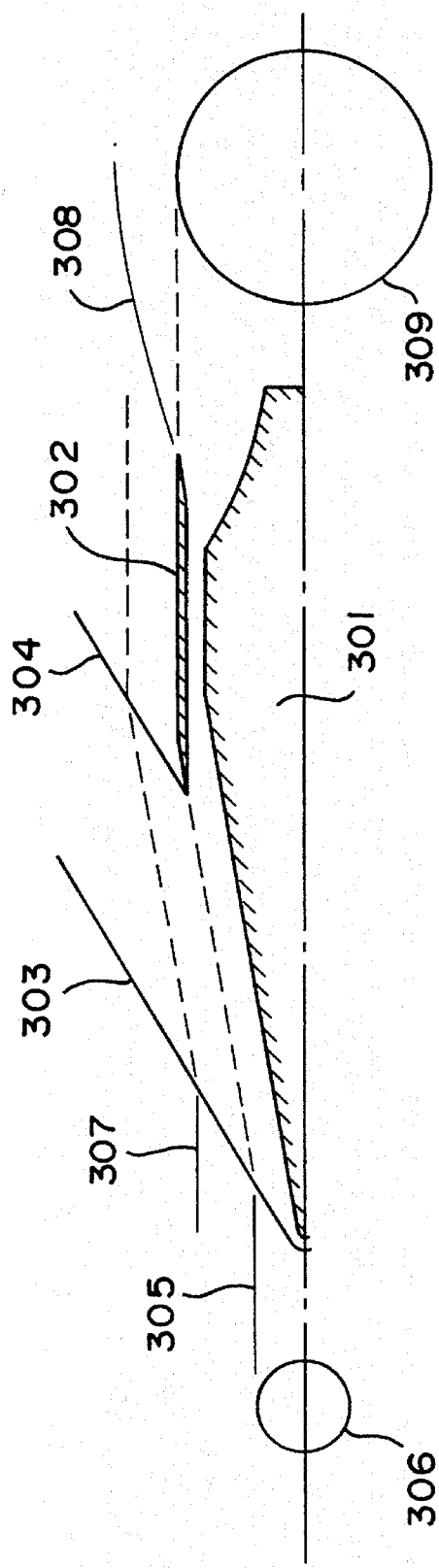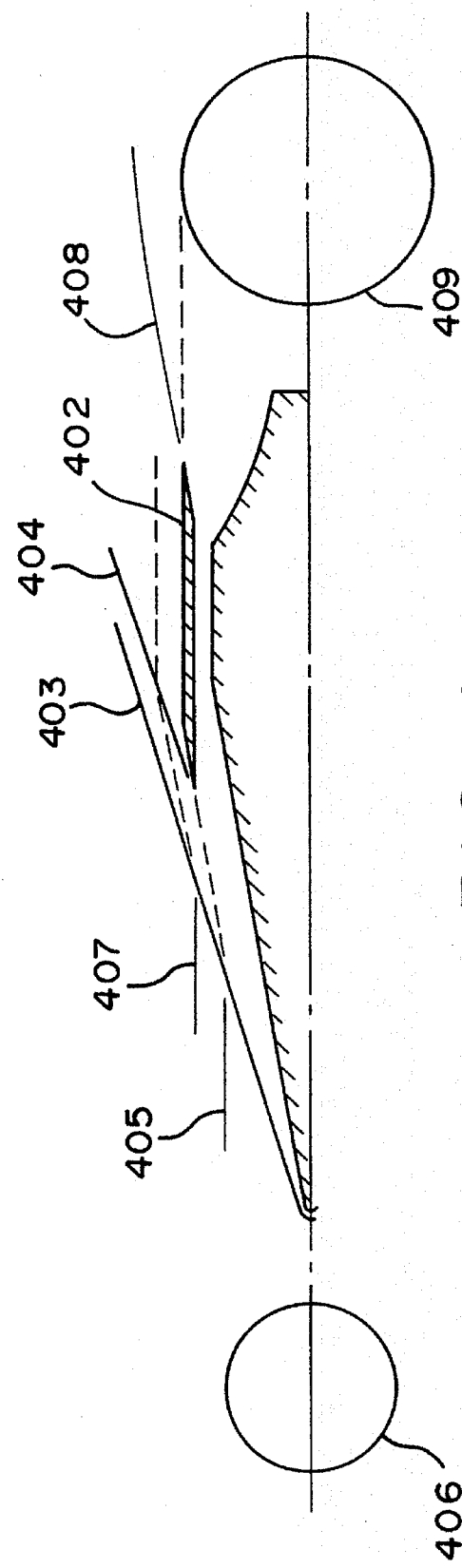

AIRBREATHING PROPULSION ASSISTED GUN-LAUNCHED PROJECTILES

BACKGROUND OF THE INVENTION

1. Field of the Invention

The present invention relates to high speed gun or artillery launched projectiles, and more particularly to airbreathing propulsion-assisted projectiles which accelerate after launch using a combination of ramjet and scramjet propulsion to enable flight at hypersonic velocities.

2. Description of the Related Art

The ramjet and supersonic ramjet (scramjet) propulsion cycles for supersonic and hypersonic (Mach >5) engines are well-known within the art of aerospace propulsion. For the sake of discussion here, consider an engine defined by an external compression device or forebody, an internal compression device such as an inlet including a diffuser and an isolator, a combustion device or combustor, and an expansion device or nozzle. All surfaces wetted by flow streamlines ultimately passing through the engine are considered to be a part of the engine flowpath since they contribute to the engine cycle performance. Consequently, the integration of the airframe and the propulsion systems for vehicles or projectiles employing these propulsion cycles is critical for high performance.

In the ramjet propulsion cycle, high velocity air is compressed through a series of forebody and inlet shocks and through a subsonic diffuser, all of which decelerate the air to a subsonic velocity near the fuel flame speed. Fuel is injected into a combustor and conventional subsonic combustion occurs, thereby increasing the temperature and pressure of the flow. The high pressure gas is then expanded through a nozzle, increasing the velocity and momentum of the flow to produce thrust. This cycle is efficient for freestream Mach numbers ranging between approximately 2 and 5. However, for freestream velocities above about Mach 5, the temperatures and pressures associated with decelerating the flow to subsonic speeds for combustion are severe and begin eroding engine cycle performance.

The static temperature at the combustor entrance approaches the stagnation temperature and dramatically impacts fuel combustion. At such extreme temperatures, an appreciable amount of the energy which would be released due to combustion is bound in dissociated air and combustion product molecules such that the temperature rise due to combustion is reduced. The energy contained in dissociated gases is largely unavailable for the expansion and acceleration of the exhaust mixture and thrust is lost as a result.

For Mach numbers above 5, the main advantage of scramjet propulsion is that supersonic velocities within the combustion chamber are accompanied by lower static temperatures, pressures, and reduced total pressure losses. By reducing combustion product dissociation reduced temperatures increase combustion efficiency, reduced pressures decrease loads on engine structure, and reduced total pressure losses (entropy gains) increase the flow energy available for thrust production.

A large number of parameters impact the specific impulse ($I_{sp}$, or thrust per pound of propellant) performance of ramjet and scramjet systems. They include, but are not limited to, the forebody and inlet contraction ratios, the inlet efficiency, the fuel mixing efficiency, the combustor efficiency, and the nozzle efficiency.

The purpose of the inlet is to capture a desired quantity of air flow and deliver it to the combustor at a desired pressure and Mach number with a minimum of entropy producing losses. The technology and parameters necessary to successfully design and operate an efficient supersonic inlet are well-known but difficult to capture in a single design. The mass flow captured by the inlet compared to the drag of the vehicle must be sufficiently large that a net thrust can be expected across the entire Mach number range of operation for achievable values of ramjet or scramjet $I_{sp}$ performance.

The isolator (also known as a constant area diffuser) is located between the inlet and the combustor entrance, and is necessary to adjust flow static pressure from that of the inlet exit to the higher combustor pressure downstream during ramjet and early scramjet ("dual-mode") operation. When combustor pressure rise is large and inlet Mach numbers low, as in ramjet operation, boundary layer separation in the combustor can lead to inlet interaction and engine unstart. An isolator permits a shock train to develop between the inlet and combustor with a near normal shock static pressure rise without any upstream inlet interaction. The length of the isolator is critical to carrying out this function.

The combustor provides the physical domain for injecting a liquid or gaseous fuel into high velocity air and mixing the fuel and air for combustion. The fluid and chemical phenomena present in the combustor are extremely complex and include the effects of laminar and turbulent mixing of fuel injection jets with boundary layers and core flows, and the finite rate chemical kinetics of the exothermic combustion reactions. Fuel ignition and flameholding are also important issues. Some of the typical design parameters are the fuel injection geometry, mixing enhancement devices, and the length of the combustor required to achieve the high mixing and combustion efficiencies necessary for high Isp performance across the Mach number range of interest. Fuel injection location and mixing rate (i.e., distribution of heat release) is also important for controlling if and where flow choking (Mach 1) occurs in the combustor. Fuel is generally injected aft in ramjet mode, both fore and aft in dual-mode (combined supersonic and subsonic combustion), and forward in scramjet mode.

The nozzle or expansion system is important to the specific impulse Isp of the projectile because it produces thrust by accelerating the high static pressure flow exiting the combustor to lower pressure and high velocity (i.e., momentum). Typically composed of internal and external nozzles, the objective is to expand the high pressure flow to the lowest pressure possible using a shape that minimizes the combination of friction losses, chemical recombination losses, and flow divergence (angularity) losses.

The ratio of the nozzle expansion area to the inlet capture area and the ratio of inlet mass flow to nonflowpath drag are critical figures of merit in designing a system which produces a flowpath thrust that exceeds the nonflowpath drag and therefore produces acceleration. Balancing the geometric details for high efficiencies and high Isp performance with the vehicle drag is the traditional challenge inherent in ramjet and scramjet vehicle design.

Methods to improve the range and velocity performance of gun or artillery launched projectiles have been investigated since the earliest development of these devices. Gun projectile velocities are ultimately limited by the speed of sound in burned propellant gases. Therefore, methods for accelerating the projectile after it leaves the barrel have also been investigated.

One approach successfully developed and commonly used today is that of a rocket-assisted projectile. A rocket motor containing a solid or liquid propellant is incorporated into the base of the projectile and ignited after leaving the barrel. The range and acceleration potential of these rocket assisted projectiles is rather limited due to the small amount of fuel which can be carried and the relatively low $I_{sp}$ which can be produced by a rocket motor in comparison to an air breathing ramjet or scramjet propulsion cycle.

Research in supersonic air-breathing propulsion systems for aircraft and missiles has been in progress since the 1940's. As empirical knowledge grew in the late 1950's, researchers investigated propulsion for hypersonic aircraft and missiles using scramjet engines. Research into scramjet propulsion continued during the 1970's at the NASA Langley Research center, and in the 1980's and 1990's grew considerably under the auspices of the National Aerospace Plane program. Unfortunately, no scramjet engines have been demonstrated outside of a wind tunnel. Again, these research activities focused exclusively on aircraft and missile applications.

U.S. Pat. No. 4,291,533 to Dugger et al. describes a rocket-launched scramjet powered missile. Typical gun-launched projectile accelerations of tens of thousands times greater than the acceleration of gravity (g) far exceed the approximately hundred g acceleration of a typical high performance rocket booster, and consequently would prevent directly adapting the missile design described or any other missile to gun launching to the velocity required to initiate a ramjet or scramjet engine.

Application of ramjet propulsion to gun-launched projectiles have been described by Olson et al. in U.S. Pat. No. 5,067,406 and by Flatau in U.S. Pat. No. 4,539,911. These patents considered tubular projectiles utilizing a solid propellant. These concepts focused on producing thrust which essentially balanced the aerodynamic drag in order to reduce the deceleration of the projectile as opposed to accelerating beyond the muzzle velocity. The lightweight construction of these projectiles also severely constrains the gun launch acceleration loads which the projectiles can survive and restricts the muzzle launch velocity. The flowpath through the center of the projectile also limits the fuel which can be carried and hence the projectile range which can be achieved or increase in velocity if thrust exceeds aerodynamic drag. These concepts cannot carry a payload of significant volume or size due to interference with the propulsive flowpath.

Botwin et al. in US Pat. No. 4,428,293 addresses the payload and fuel volume issues of the previously referenced patents to Olson et al. and Flatau. However, Botwin specifically discloses that the ramjet powered projectile is designed to maintain a thrust-to-drag balance such that it follows a predetermined vacuum ballistic trajectory.

A scramjet system launched from a light gas gun for scramjet propulsion testing and experiments in a closed test chamber was documented in 1968 by H. H. King and O. P. Prachar in the Air Force Aero Propulsion Laboratory Technical Report AFAPL-TR-68-9. This study represents the only known attempt to launch a scramjet-shaped projectile from a gun barrel, and was conducted to investigate issues pertaining to launch and acceptable free flight of an annular combustor scramjet model. The scramjet model was too small to include a fuel system, and was therefore limited to unfueled launches to verify structural integrity and aerodynamic stability. Fuel systems were tested separately in simple cones only, not in scramjets.

The design of the model included an internal contraction ratio (i.e., the ratio of the inlet area at the cowl leading edge to the minimum flow area downstream of the cowl leading edge) of unity for positive inlet starting characteristics, but with a very low airflow capture area to drag ratio with the result that a net thrust or positive acceleration could not be produced even if it was fueled.

OBJECTS AND SUMMARY OF THE INVENTION

It is therefore a principal object of the present invention to provide an air-breathing, propulsion-assisted projectile capable of travel at hypersonic velocities which will overcome all the deficiencies and drawbacks of currently known air breathing propulsion assisted projectiles.

Another object of the present invention is to provide a novel air-breathing, propulsion-assisted projectile which is capable of acceleration from initial ramjet combustor operation at supersonic projectile velocities to scramjet combustor operation at hypersonic velocities.

Still another object of the invention is to provide an air-breathing propulsion-assisted projectile which is capable of accelerating from initial scramjet combustor operation at high supersonic or low hypersonic velocities to scramjet combustor operation at high hypersonic velocities.

Still another object of the invention is to provide an air-breathing propulsion-assisted projectile which can use either liquid or gaseous fuels.

Yet another object of the invention is to provide a structurally efficient design which incorporates an integral ramjet or scramjet inlet, a combustor, a nozzle, a fuel storage tank, and a payload storage cavity, where the design is able to withstand the high acceleration loads of a gun launch.

Still another object of the invention is to provide an air-breathing propulsion assisted projectile which can fly long range at low flight path angle trajectories with high terminal velocities, or which can fly high flight path angle trajectories to deliver suborbital and orbital payloads.

These and other objects are achieved by the projectile assembly of the present invention which includes a forebody having an air compression surface, an engine assembly disposed in a mid-region of the body and including an encompassing cowl disposed about the circumference of the body mid-region, and a nozzle section disposed rearwardly of the engine assembly. The projectile assembly also includes a sabot or container-like shell which encircles the rearward portion of the nozzle section, and protects that region of the projectile from the explosive gases generated by the gun in which the projectile sits until it is fired from the gun. The cowl leading edge portion is configured to cooperate with the external surface of the projectile to capture the air which has been compressed by, and is leaving, the compression surface of the projectile body. The facing surfaces of the cowl and the body are configured to define therebetween a throat in which takes place further compression of the air, introduction of fuel, and expansion of the combusted air-and-fuel. The rear end portion of the cowl is configured to direct the exiting combusted air-and-fuel mixture over the nozzle section of the projectile.

BRIEF DESCRIPTION OF THE DRAWINGS

FIG. 2a shows a side view of a preferred embodiment of a scramjet projectile according to the present invention;

FIG. 2b is an axial view of the projectile shown in FIG. 2a taken at a location immediately in front of the nosetip 203 of the projectile;

FIG. 2c is an axial view of the projectile shown in FIG. 2a taken at a location immediately to the rear of the base 214 of the projectile;

FIG. 3 is a side sectional view of a projectile showing the relationship between the fluid flowing past the projectile and the inlet capture area at supersonic flight velocity;

FIG. 4 is a side sectional view of a projectile showing the relationship between the fluid flowing past the projectile and the inlet capture area at hypersonic flight velocity

Similar elements or parts in the various figures of the drawings are designated by the same or similar reference characters.

DETAILED DESCRIPTION OF THE PREFERRED EMBODIMENTS

Figure 1:
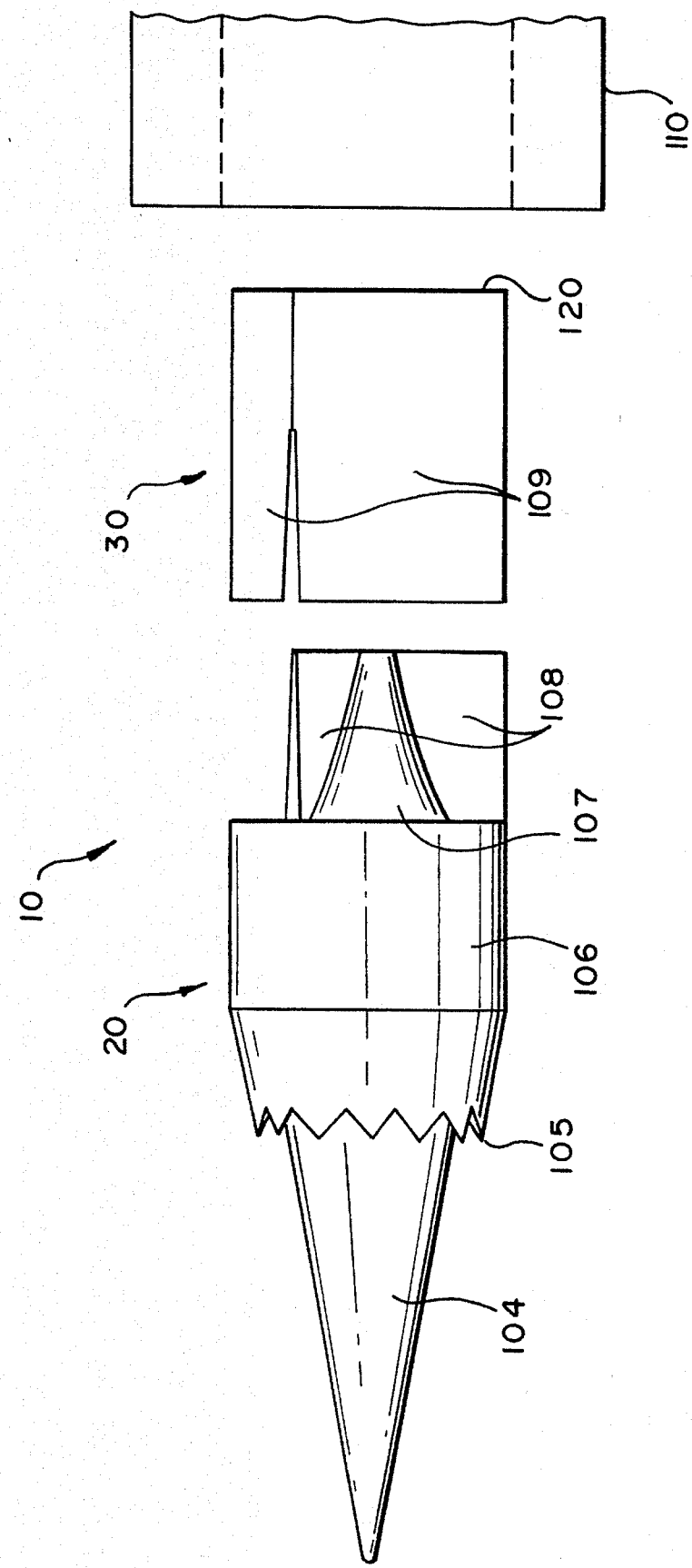
FIG. 1 illustrates the main components of the scramjet projectile assembly according to the present invention.
Figure 5:
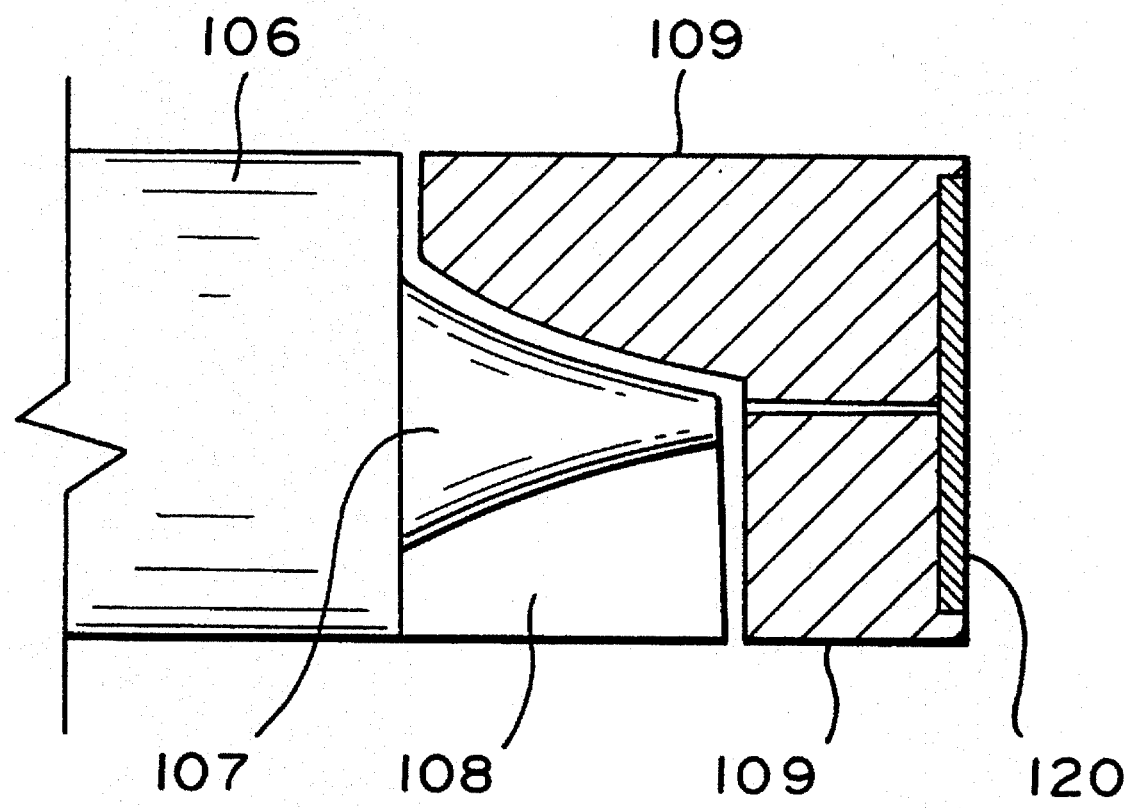
FIG. 5 is a sectional view of the sabot assembly 30 shown in FIG. 1 in the relationship to the trailing end of the projectile.

FIG. 1 and 5 illustrate a scramjet projectile 10 according to the present invention, which includes a projectile assembly 20 and a sabot assembly 30 (shown in FIG. 5).

The projectile of assembly 20 has a forebody 104 exhibiting a compression surface, a cowl 106 enclosing an engine assembly (to be discussed in detail when referring to the embodiment of the projectile shown in FIG. 2), a scramjet nozzle 107 exhibiting an expansion surface, and aerodynamic stabilization fins 108. The forebody 104 must have an external surface configured to compress the fluid (i.e., air) as the projectile travels in its trajectory. The cowl 106 includes a leading edge 105 which preferably is notched to provide a low drag coefficient and low aerodynamic heating. The use of fins 108 is desirable insofar as it tends to stabilize the projectile.

The sabot assembly 30 comprises a plurality of annular segments 109 which are attachable to one another to form a hollow shell. The downstream, or trailing, end of the shell is closed by an end piece (not shown, but designated by reference numeral 120), and all the shell components and the end piece, when assembled together, form a container. The sabot assembly receives the trailing or nozzle end of the projectile (see 214,221 in FIG. 2a)in a snug fit, and protects the nozzle end from the explosive gases of the gun when the latter is fired. As the projectile assembly and sabot assembly emerge from the gun barrel 110, the sections 109 of the sabot assembly separate from one another along separation lines 130 (see FIGS. 1 and 5)and from the rear (aft) end of the projectile nozzle. In this manner, operation of the engine assembly can be initiated, and the projectile assembly can then accelerate onward in its trajectory.

Referring now to FIGS. 2a, 2b and 2c, there is shown a preferred embodiment 200 of the projectile assembly illustrated in FIG. 1, which includes a forebody 204 having an external compression surface C extending from the projectile nosetip 203 rearwardly to the vicinity of the leading edge of the cowl 202, and an external expansion surface or nozzle 221 extending from the vicinity of the trailing edge of the cowl rearwardly. The projectile also includes an internal volume for fuel systems and a payload bay 215. The cowl 202 surrounds the body 204 in such a manner as to create an engine internal flowpath defined by an inlet region 205, an isolator region 206, and a combustor region 208 and an internal nozzle 209. The cowl 202 is supported by splitters 216 spaced circumferentially about the projectile body. Although not a critical feature of the structure, the cowl leading edge (see 105 in FIG. 1) is notched for each internal flowpath in order to provide sweep relative to the axial direction for lower drag, aerodynamic heating and inlet starting characteristics. The splitters serve to segregate the neighboring internal flowpaths which are individually fueled by fuel injectors 207 located in the combustor region 208. While not shown in these figures, fuel injectors may also be located in the splitters.

The fuel tank 210 contained within the body is connected to the fuel injectors via a fueling control valve 218, fuel lines 211 and 213, and distribution and pressure equalizing manifolds 212. The fuel control valve 218 provides a mechanism for loading fuel into the tank and for preventing fuel from reaching the fuel injectors prior to leaving the gun barrel. The fuel line 211 is routed very close to the wall of the combustor region 208 in order to cool the wall and add heat to the fuel prior to its reaching the injector 207. For a liquid fuel, the tank 210 must be pressurized by a pressurization system 219 which imparts a force to the piston or diaphragm 220 once the projectile clears the gun barrel. The pressurization profile of the system coupled with the fuel lines 211 and 213, the manifolding 212, and the orifice size of the fuel injectors may be used to tailor the injected fuel mass flow rate as a function of the projectile flight time. For a gaseous fuel, the fuel tank could be pressurized through the fuel control valve 218. The fuel lines 211, 213, the manifolding 212, and the orifice size of the fuel injectors 207 could again be used to tailor the injected gaseous fuel mass flow rate as a function of the projectile flight time.

The stability of the scramshell projectile 200 after launch is provided by a plurality of stabilization fins 217 integrated with selected splitters. Although not shown, the span of these fins and hence their area could be increased beyond the barrel diameter using devices located within the fins and deployed after the projectile clears the barrel 110. The stability of the projectile within the gun barrel is provided by the sabot assembly 30 which protects the rear end of the projectile from the high pressure gun blast initially propelling the projectile and provides a mechanism for transferring the force of the blast to the high strength projectile base 214. Once the sabot assembly clears the end of the gun barrel, the aerodynamic loads on the sabot sections causes the sections of the sabot "container" to separate from one another as well as from the projectile itself. Of course, it is understood that a release mechanism within the sabot "container", such as a spring, could also cause the sections to separate and the "container" to dissociate itself from the rear end of the projectile.

The projectile assembly clears the end of the gun barrel at supersonic or near-hypersonic velocities. At that time, the sabot "container" separates from the projectile, and nearly simultaneously with the separation event, the fuel is injected into the combustor region 208 where it is ignited. At this point, the projectile will accelerate from the supersonic or near-hypersonic launch velocity to a higher velocity as long as sufficient air is captured by the inlet defined between the cowl leading edge and the projectile body. By adding fuel in a ramjet or scramjet cycle, and expanding the combustion products through the nozzle, the thrust produced is sufficient to exceed the drag of the projectile.

The specific impulse for a ramjet cycle is high for Mach numbers between 2 and 5, and decreases as the Mach number increases. Transitioning to scramjet propulsion at about Mach 6, the specific impulse continues to decline, but at a reduced rate in comparison to the ramjet cycle. In order to compensate for the declining specific impulse with Mach number trend, the air captured by the inlet must increase with the increasing Mach number to retain the desired high levels of thrust.

FIGS. 3 and 4 show schematically how the flow structure changes between the supersonic launch Mach number and a higher hypersonic Mach number in order to provide increasing air capture. At the launch Mach number, the angle of the bow shock 303 is steep relative to the longitudinal axis of the projectile. Consequently, the streamline 305, which represents the outer boundary of fluid flow passing through the internal flowpath, is relatively close to the body. For the axisymmetic embodiment shown, this streamline, when rotated about the axis of symmetry, defines a circular "capture" area (depicted at 306) through which the air mass encountered by the projectile inlet passes. Air outside the streamline is pushed outside the cowl 302 and does not contribute to the development of thrust for the projectile. As the projectile speed increases to hypersonic Mach numbers, the angle of the bow shock 303 relative to the longitudinal axis of the projectile becomes smaller, as shown at 403. The streamline 305 moves farther away from the body as shown at 405, thus increasing the air captured by the inlet 406, and partially, if not entirely, offsetting the increased drag at the higher Mach numbers.

As the Mach number increases, the nozzle expansion area 309 and 409 remains constant, insofar as it is a function only of the projected area of the flowpath base. Consequently, the ratio of the nozzle expansion area 309 to the inlet capture area 306 at supersonic speeds decreases with increasing Mach number as illustrated at 409 and 406. At supersonic Mach numbers, the ratio of expansion to capture areas is high and supports high propulsion efficiency, high thrust to drag ratios, and high projectile accelerations to quickly reach higher velocities. At hypersonic velocities, the projectile of the invention exhibits a lower, yet adequate, expansion to capture area ratio such that good propulsion performance is obtained.

The air-breathing propulsion-assisted projectile is capable of flying low flight path angle trajectories over long distances unachievable by conventional unpowered ballistic projectiles. This is feasible by sizing the projectile such that after a supersonic launch, it accelerates to the design supersonic or hypersonic Mach number where thrust equals drag and contains enough fuel to provide airbreathing thrust for the length of the flight.

The air-breathing projectile of the invention is capable of flying high flight path angle or lofted trajectories which reach altitudes unachievable by conventional unpowered ballistic projectiles. By accelerating through the high density lower portion of the atmosphere with a thrusting projectile, higher velocities and thus greater altitudes can be reached in comparison to the coasting and decelerating unpowered projectile. For equivalent muzzle velocities, a larger payload mass can be delivered to a given altitude using the airbreathing propulsion-assisted projectile of the present invention than can be obtained using the conventional, unpowered projectiles.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An airbreathing propulsion-assisted projectile adapted to be fired from a gun at velocities greater than Mach 1, comprising:

a body, including an external compression section, an internal compression section, a combustion section and a nozzle section having an external diameter, a fuel supply isolated from said combustion section, means for directing ambient fluid to said combustion section of the body, said directing means and said body cooperating with the ambient fluid to produce thrust greater than drag when said projectile travels at velocities greater than Mach 1, and a plurality of circumferentially spaced stabilization fins located within said external diameter of said nozzle section of said body to protect said fins from the gun barrel walls during firing of the projectile from said gun.

2. The projectile of claim 1, wherein said internal compression section defines a passageway having an internal contraction ratio greater than one.

3. The projectile of claim 1, and further including means for providing fuel at said combustor section.

4. The projectile of claim 1, and further including a sabot assembly releasably secured to the rear portion of said body, said sabot assembly including a plurality of elements which are joined together about the body rear portion and form a housing for protecting said body rear portion from explosive gases in the barrel of said gun.

5. The projectile of claim 4, and further including means for providing fuel at said combustor section, and means, coupled with at least one of said plurality of elements, for initiating operation of said fuel providing means when said plurality of elements separate from said projectile as it exits from said gun barrel.

6. The projectile of claim 1, wherein said body further includes a payload compartment.

7. The projectile of claim 3, wherein said fuel providing means comprise a source of fuel, control valves, fuel routing lines connecting the fuel source with the combustion section of the body.

8. The projectile of claim 1, wherein said nozzle section includes an internal expansion surface and an external expansion surface.

9. An airbreathing propulsion-assisted projectile adapted to be fired from a gun and capable of travel at velocities greater than Mach 1, comprising:

an engine having a fixed geometry flowpath for generating thrust greater than drag so that said projectile accelerates to hypersonic velocities.

10. The projectile of claim 9, wherein said engine comprises first engine means for compressing ambient air flowing past said projectile, channeling said compressed air through a passageway, combusting said channeled air, and expanding said combusted air in a first ramjet mode of operation, and second engine means for compressing ambient air, channeling said compressed air through said passageway, combusting said channeled air, and expanding said combusted air in a second scramjet mode of operation.

11. The projectile of claim 10, said flowpath including fixed geometry compression and combustion sections for transitioning said mode of operation from said first ramjet mode of operation to said second scramjet mode of operation during the operative cycle of said engine.

12. The projectile of claim 11, wherein said transitioning means comprises means for operating both the ramjet engine mode and the scramjet engine mode simultaneously.

13. The projectile of claim 9, wherein said engine comprises ramjet engine means and scramjet engine means, and further comprising means for transitioning the mode of operation of said engine from the ramjet engine mode of operation to the scramjet mode of operation during the operative cycle of said engine.

14. The projectile of claim 13, wherein said transitioning means comprises means for operating both the ramjet engine mode and the scramjet engine mode simultaneously.

15. An airbreathing propulsion-assisted projectile adapted to be fired from a gun and capable of travel at velocities greater than Mach 1, comprising:
- a body having an exterior surface,
- engine means disposed about said exterior surface of said body and including a combustion section,
- a fuel supply within the body and isolated from said combustion section, and
- a compression section external to the body and having an internal contraction ratio greater than one, whereby said projectile generates thrust greater than drag and therefore accelerates during its engine operation cycle.

16. The airbreathing propulsion assisted gun-launched projectile of claim 15, and further comprising annular cowl means, said cowl means and the exterior surface of said body defining an interior flowpath.

17. The airbreathing propulsion assisted gun-launched projectile of claim 16, wherein fuel is supplied from said fuel supply to said internal flowpath during operation of said engine.

18. The airbreathing propulsion assisted gun-launched projectile of claim 17, said flowpath includes an inlet having a contraction ratio greater than one, an isolator, a combustor and an internal nozzle, and said flowpath enables operation of the projectile in a ramjet mode, a scramjet mode or a combination of ramjet and scramjet modes.

19. The airbreathing propulsion assisted gun-launched projectile of claim 18, wherein said body further includes fuel injection means, and the operating mode of the projectile is dependent on the velocity of the projectile through the ambient fluid and the location of fuel introduced into the flowpath by the fuel injection means.

20. The airbreathing propulsion assisted gun-launched projectile of claim 13, wherein said body further comprises a tank for holding said fuel supply, fuel pressurizing means, fuel injectors, fuel lines coupling said tank with said injectors, valve means coupled with said fuel lines for selectively permitting delivery of fuel from said tank to said injectors, and pressure equalizing manifold means between said injectors and said valve means.

21. The airbreathing propulsion assisted gun-launched projectile of claim 20, wherein said valve means further functions to permit the loading of fuel into said tank.

22. The airbreathing propulsion assisted gun-launched projectile of claim 20, wherein said fuel lines are routed very close to the exterior surface of said body at said combustion section to cool said surface and impart heat to the fuel in said lines prior to the fuel reaching said injectors.

23. The airbreathing propulsion assisted gun-launched projectile of claim 20, and further including a fuel tank pressurization system for imparting pressure on said body of fuel in said tank to force said fuel through the lines to said injectors.

24. An airbreathing propulsion-assisted projectile capable of travel at velocities greater than Mach 1, comprising:
- an engine for generating thrust greater than drag so that said projectile accelerates to hypersonic velocities, wherein said engine includes a nozzle section having an internal expansion surface and an external expansion surface.

25. An airbreathing propulsion assisted gun-launched projectile, comprising:
- a body having an internal flowpath with a fixed geometry, said flowpath including an inlet having a contraction ratio greater than one, an isolator, a combustor and an internal nozzle,
- said flowpath enabling operation of the projectile in a ramjet mode, a scramjet mode or a combination of ramjet and scramjet modes.

26. The projectile of claim 25, and further including a sabot assembly releasably secured to a rear portion of said body, said sabot assembly including a plurality of elements which join together to form a protective housing for said body rear portion.

27. The airbreathing projectile of claim 25, wherein said body further includes fuel injection means, and the operating mode of the projectile is dependent on the velocity of the projectile through the ambient fluid and the location of fuel introduced into the flowpath by the fuel injection means.

28. The airbreathing projectile of claim 25, wherein said body further includes means for compressing ambient air, a cowl surrounding the body downstream of said compressing means, fuel injection means, and fuel supply means isolated from said internal flowpath,
- said cowl including means for creating defined flows of said compressed ambient air and means for routing said flows from said inlet to said combustor, and wherein said fuel injection means communicates said fuel supply with said combustor.

29. The airbreathing projectile of claim 28, wherein said internal nozzle comprises fluid expansion means at the aft end of said cowl.

30. The airbreathing projectile of claim 29, wherein said body further includes fluid expansion means aft of said cowl.

* * * * *